(12) United States Patent
Chu et al.

(10) Patent No.: US 8,230,554 B2
(45) Date of Patent: Jul. 31, 2012

(54) HINGE WITH SPACERS

(75) Inventors: Chin-Sheng Chu, Shulin (TW); Chung-Yu Lee, Shulin (TW); Lu-Yu Chiang, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 224 days.

(21) Appl. No.: 12/659,973

(22) Filed: Mar. 26, 2010

(65) Prior Publication Data

US 2011/0232034 A1    Sep. 29, 2011

(51) Int. Cl.
*E05D 11/08*  (2006.01)

(52) U.S. Cl. .......................................... 16/337; 16/340

(58) Field of Classification Search ............ 16/337–342, 16/321, 331, 332; 361/679.08, 679.11, 679.02, 361/679.15, 679.27; 455/90.3, 575.1, 575.3, 455/575.8; 379/433.12, 433.13; 348/373, 348/333.01, 333.06, 794

See application file for complete search history.

(56) References Cited

U.S. PATENT DOCUMENTS

| | | | | |
|---|---|---|---|---|
| 5,697,125 A * | 12/1997 | Gannon | | 16/342 |
| 6,530,123 B1 * | 3/2003 | Wahlstedt | | 16/342 |
| 6,988,294 B2 * | 1/2006 | Birtley | | 16/342 |
| 7,143,476 B2 * | 12/2006 | Minami | | 16/340 |
| 7,958,600 B2 * | 6/2011 | Kuo et al. | | 16/342 |
| 7,992,255 B2 * | 8/2011 | Chang | | 16/337 |
| 8,046,875 B2 * | 11/2011 | Wang et al. | | 16/338 |
| 2005/0155183 A1 * | 7/2005 | Lu et al. | | 16/340 |
| 2007/0094845 A1 * | 5/2007 | Chang et al. | | 16/342 |
| 2009/0235489 A1 * | 9/2009 | Chang et al. | | 16/340 |

\* cited by examiner

*Primary Examiner* — Chuck Y. Mah (74) *Attorney, Agent, or Firm* — Bacon & Thomas, PLLC (57) ABSTRACT

A hinge has a pintle, a spacer assembly, a stationary bracket and a rotating bracket. The pintle is mounted through the spacer assembly and is connected to the stationary and rotating brackets. The spacer assembly has multiple spacers stacked with each other. Each spacer has a ring segment and a bearing segment. The ring segment is mounted around the pintle. The bearing segment has an absorbing space to absorb the stress acting on the ring segment. Therefore, the spacer sustains less stress to prevent breakage easily and a lifespan of the spacer is extended. Therefore, the hinge has a longer lifespan.

17 Claims, 14 Drawing Sheets

HINGE WITH SPACERS

BACKGROUND OF THE INVENTION

1. Field of the Invention

The present invention relates to a hinge with spacers, especially to a hinge mounted between a cover and a base of an electronic device.

2. Description of the Prior Arts

A hinge with spacers is mounted between a cover and a base of an electronic device and comprises a pintle and multiple spacers. The pintle is mounted through the spacers. When the pintle is rotated relative to the spacers, the pintle rubs against the spacers to provide friction for holding the cover at desired visual angles. However, due to spacer design, different parts of the spacer bear different stress. If one part of the spacer sustains excessive stress, the spacer may break and require repair.

Figure 19:
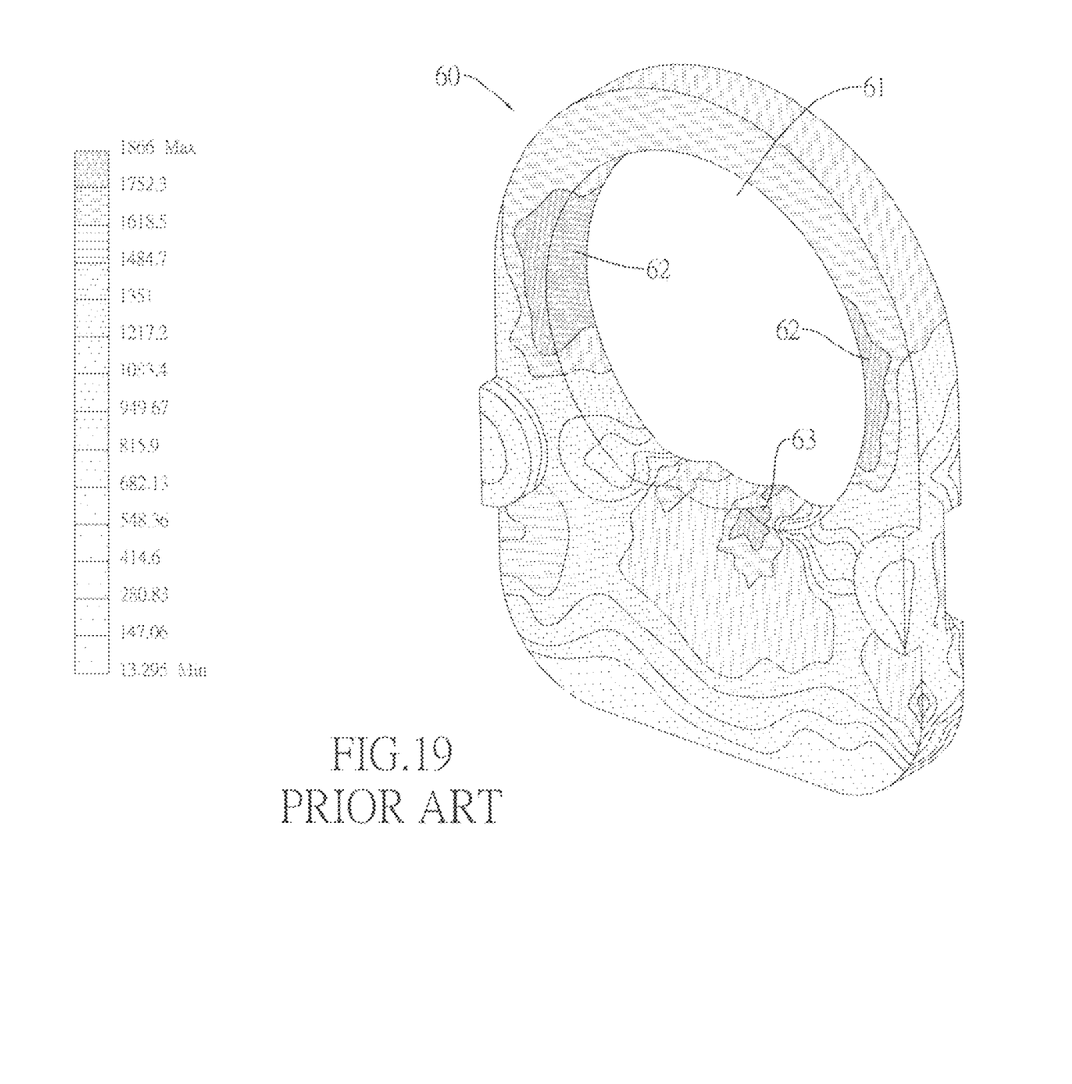
FIG. 19 is a stress distribution view of a conventional spacer for a conventional hinge in accordance with the prior art.

With reference to FIG. 19, a conventional spacer (60) for a conventional hinge has a central hole (61) and a topographical map in FIG. 19 shows stress in MPa across the spacer (60) when a pintle is rotated to 5 degrees. Two sidewalls (62) and a positioning segment (63) of the spacer (60) bear greatest stress, as high as 1866 MPa. Since the conventional hinge is required to pass a rotating test comprising at least twenty thousand rotations, such areas are prone to failure during such test. The sidewalls (62) continuously bear excessive stress so that the conventional spacer (60) is easily broken from the sidewalls (62). Furthermore, excessive stress acting on the positioning segment (63) results in wearing away of the positioning segment (63) leading to loss of positioning function of the positioning segment (63).

To overcome the shortcomings, the present invention provides a hinge with spacers to mitigate or obviate the aforementioned problems.

SUMMARY OF THE INVENTION

The main objective of the present invention is to reduce stress acting on spacers of a hinge. The hinge has a pintle, a spacer assembly, a stationary bracket and a rotating bracket. The pintle is mounted through the spacer assembly and is connected to the stationary and rotating brackets. The spacer assembly has multiple spacers stacked with each other. Each spacer has a ring segment and a bearing segment. The ring segment is mounted around the pintle. The bearing segment has an absorbing space to absorb stress acting on the ring segment. Therefore, the spacer sustains less stress to prevent breakage and lifespan of the spacer is extended. Therefore, the hinge also has a longer lifespan.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
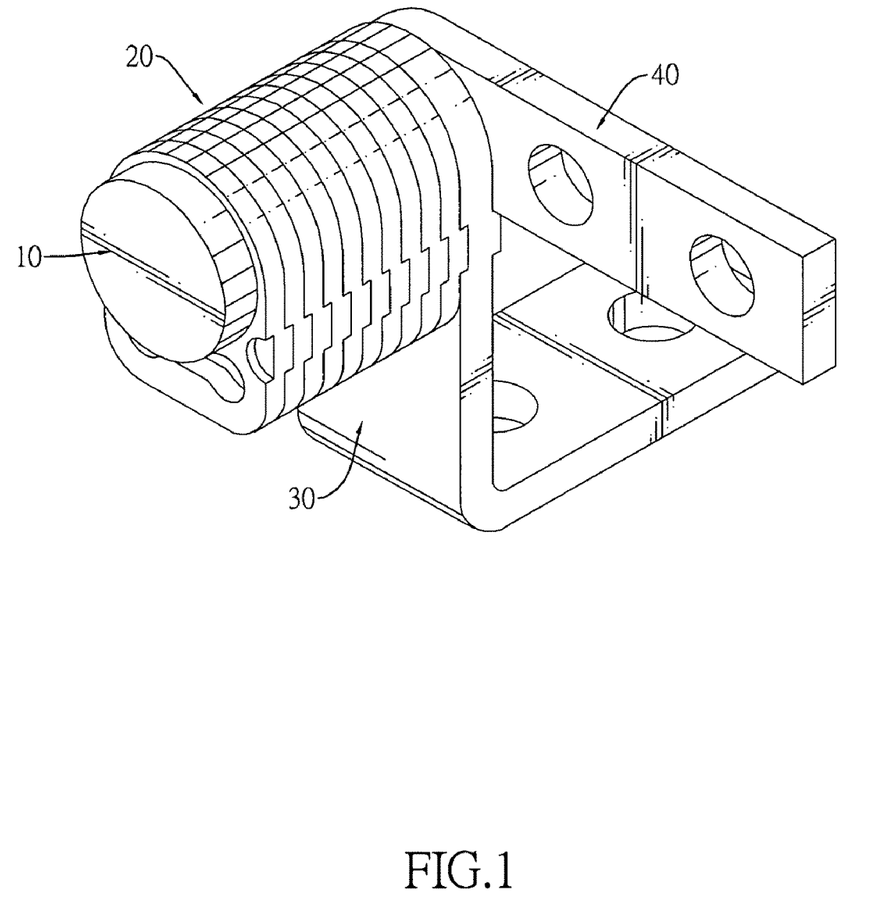
FIG. 1 is a perspective view of a first embodiment of a hinge with spacers in accordance with the present invention.
Figure 2:
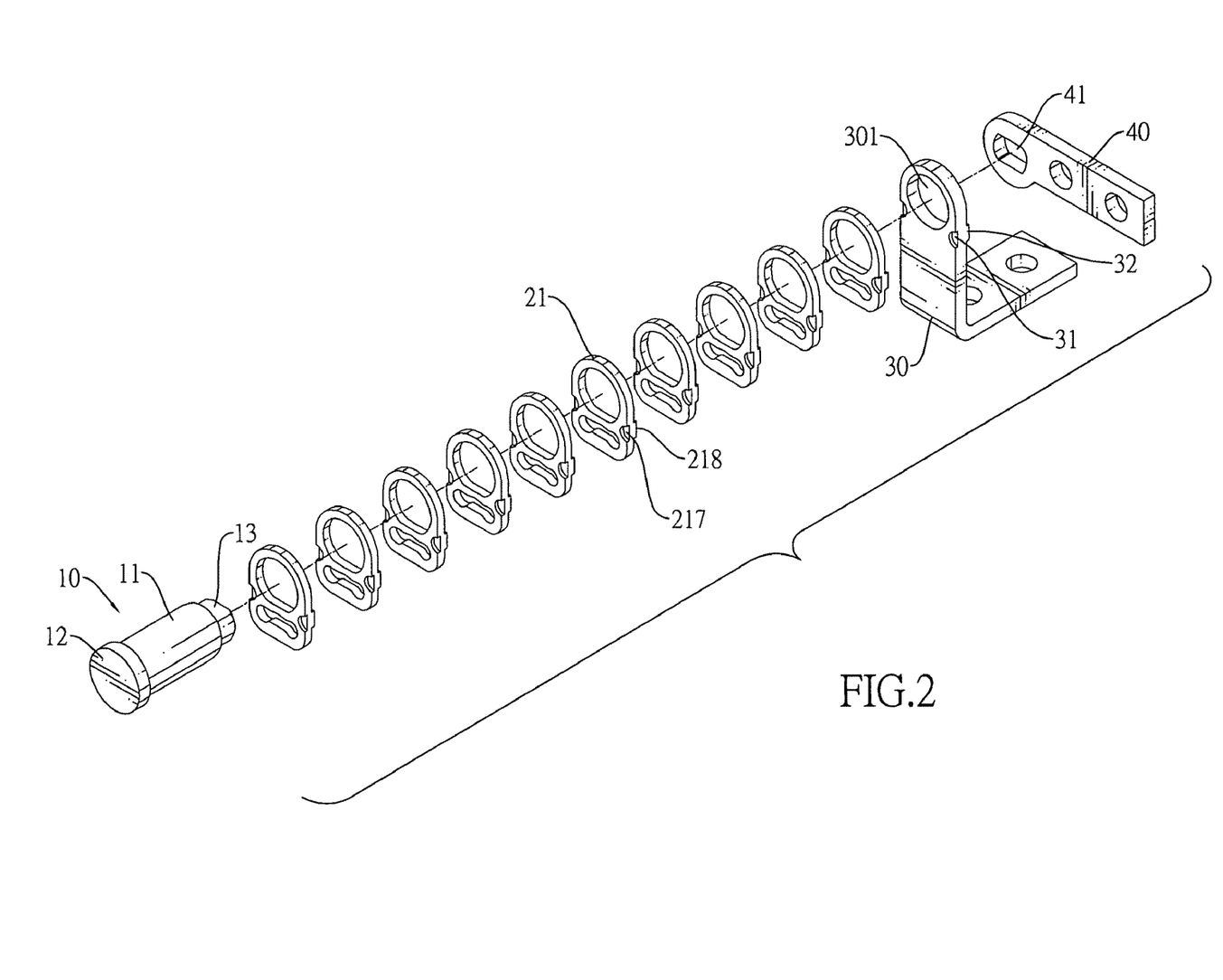
FIG. 2 is an exploded perspective view of the hinge in FIG. 1.

With reference to FIGS. 1 and 2, a hinge with multiple spacers in accordance with the present invention comprises a pintle (10), a spacer assembly (20), a stationary bracket (30) and a rotating bracket (40).

The pintle (10) has a rod body (11), an enlarged head (12) and a fastening segment (13). The enlarged head (12) is formed transversely on a distal end of the rod body (11). The fastening segment (13) is formed on a proximal end of the rod body (11) and is non-circular in cross section.

Figure 3:
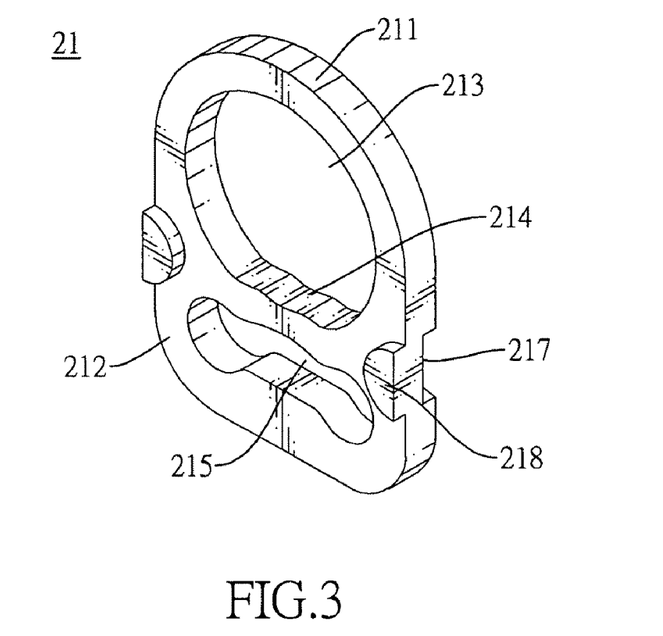
FIG. 3 is a perspective view of a first embodiment of a spacer of the hinge in FIG. 1.
Figure 4:
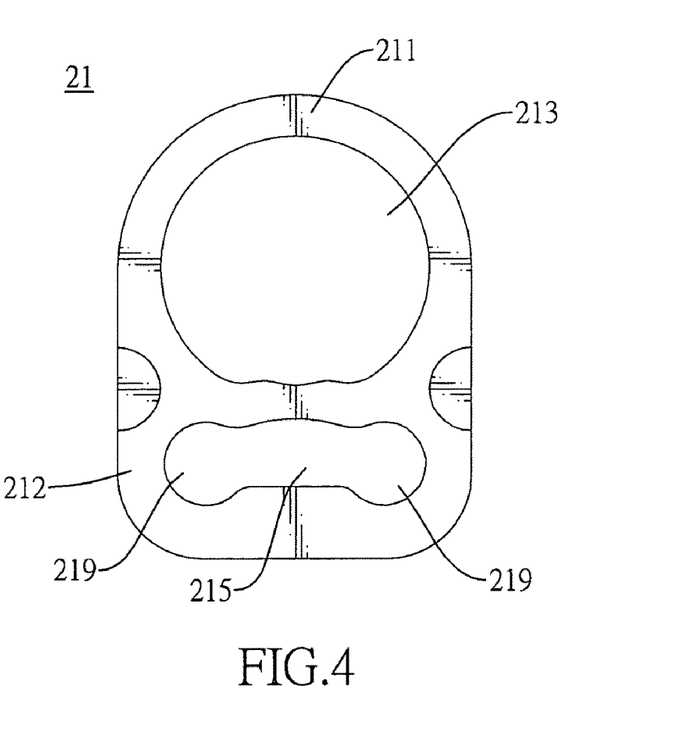
FIG. 4 is a front view of the spacer in FIG. 3.

With reference to FIGS. 2 to 4, the spacer assembly (20) is mounted rotatably around the pintle (10) and comprises multiple spacers (21) stacked with each other. Each spacer (21) has a ring segment (211) and a bearing segment (212). The ring segment (21) is mounted rotatably around the pintle (10) and has a central hole (213) and a positioning segment (214). The central hole (213) of the ring segment (21) is mounted around the rod body (11). The positioning segment (214) is formed on an inside wall around the central hole (213) and abuts against the rod body (11) to provide a positioning function. The rod body (11) may have a flat surface to rub against the positioning segment (214) of the spacer (21). The bearing segment (212) protrudes from an outside wall of the ring segment (211) and has an absorbing space (215) formed in the bearing segment (212).

The stationary bracket (30) is mounted rotatably around the pintle (10) and is connected securely to the spacer assembly (20).

The rotating bracket (40) is mounted securely around the fastening segment (13) of the pintle (10) to hold the spacer assembly (20) between the rotating bracket (40) and the enlarged head (12) of the pintle (10). The rotating bracket (40) has a keyed hole (41) engaging with the fastening segment (13) of the pintle (10).

Figure 5:
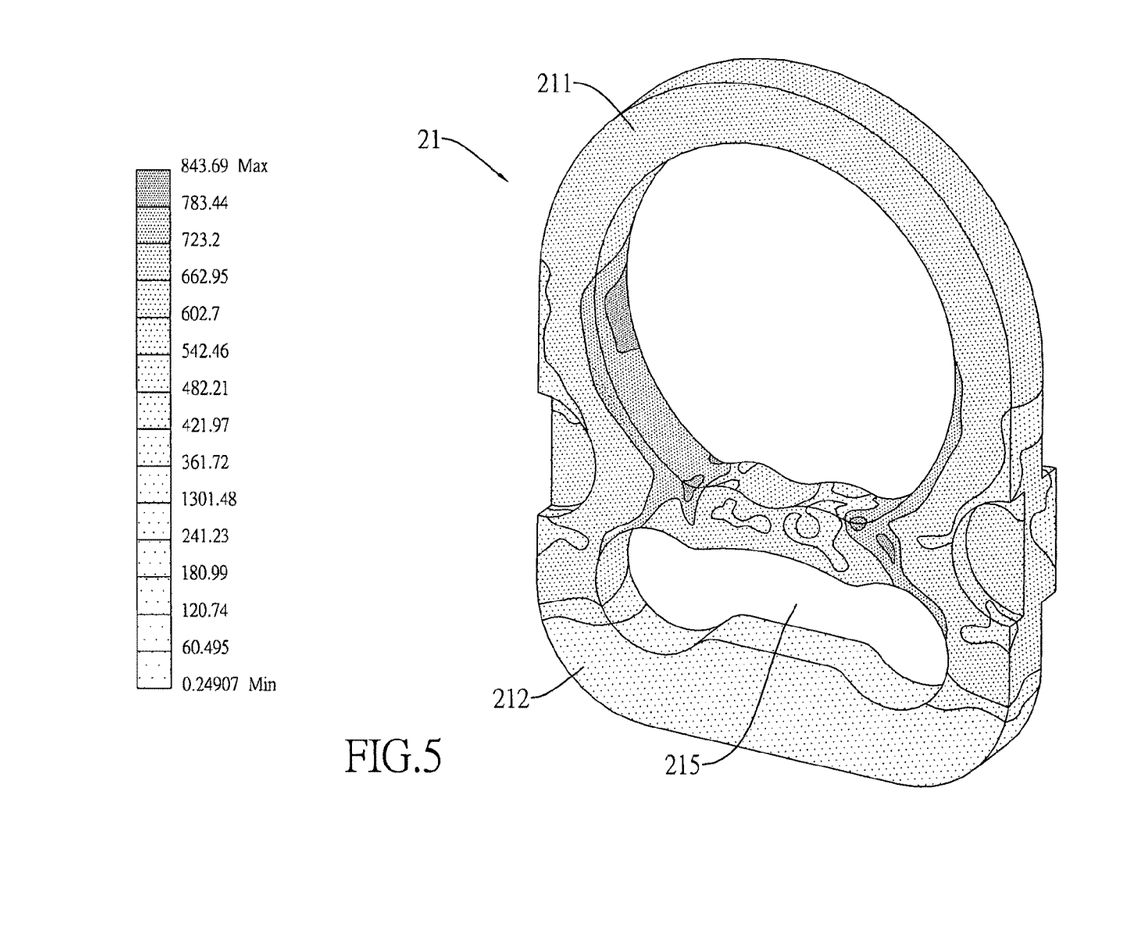
FIG. 5 is a stress distribution view of the spacer in FIG. 3.

With reference to FIGS. 2 and 5, when the rod body (11) of the pintle (10) is rotated relative to the ring segments (211) of the spacers, the absorbing spaces (215) provide a cushioning effect. The ring segments (211) press toward the bearing segments (212) and the bearing segments (212) deform via the absorbing spaces (215) to absorb the stress. As the stress distribution shown in FIG. 5, the maximum stress only reaches 843.69 MPa. The spacers (21) sustain much less stress to keep from breaking easily. Then, the lifespan of the spacer (21) is extended and the tolerant rotating times of the spacer (21) are increased. Therefore, the hinge as described has longer lifespan.

The hinge in accordance with the present invention has basic structure as mentioned above. The alternative structures are described below.

Figure 6:
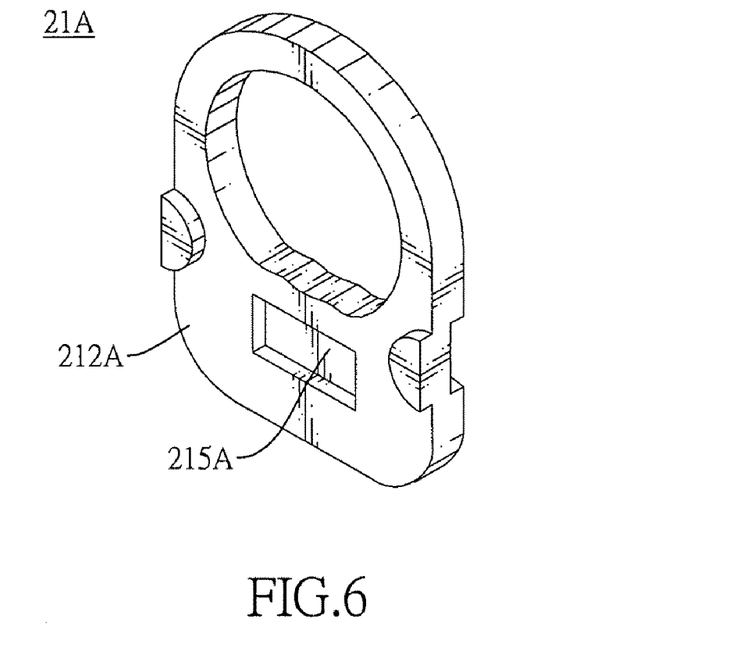
FIG. 6 is a perspective view of a second embodiment of a spacer of the hinge in accordance with the present invention.
Figure 7:
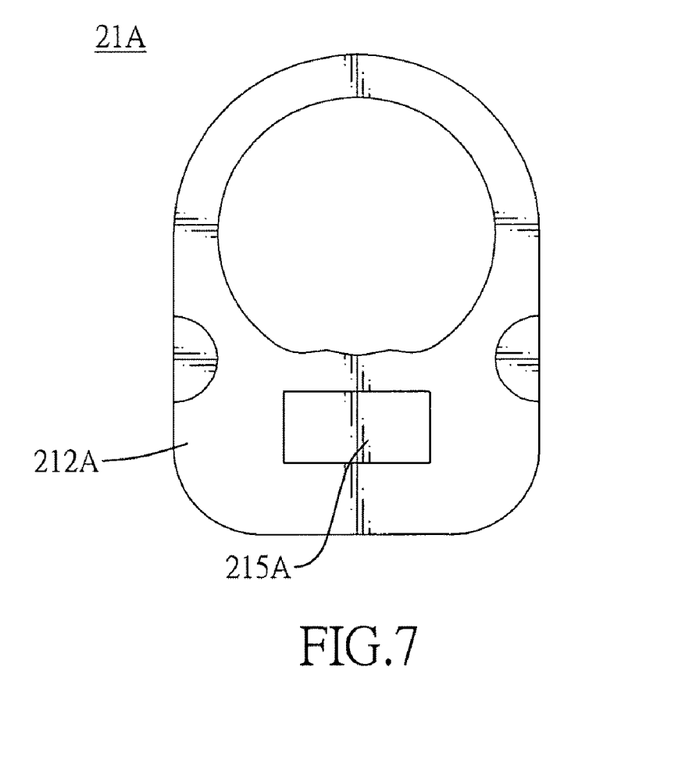
FIG. 7 is a front view of the spacer in FIG. 6.

The absorbing space of the spacer may be altered in many forms as long as the bearing segment (212) can absorb the deformation of the ring segment (211) generated by the rotation of the rod body (11). In a preferred embodiment as shown in FIGS. 6 and 7, the absorbing space (215A) of each spacer (21A) is a recess and is formed in a surface of the bearing segment (212A). In another preferred embodiment as shown in FIG. 4, the absorbing space (215) is an elongated hole formed through the bearing segment (212). Furthermore, the absorbing space may be a thinner part formed on the surface of the bearing segment.

Figure 8:
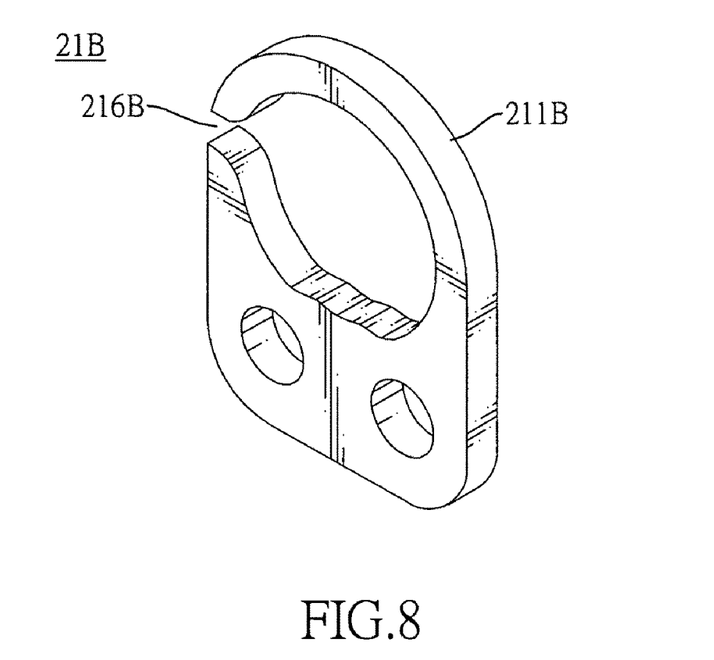
FIG. 8 is a perspective view of a third embodiment of a spacer of the hinge in accordance with the present invention.
Figure 9:
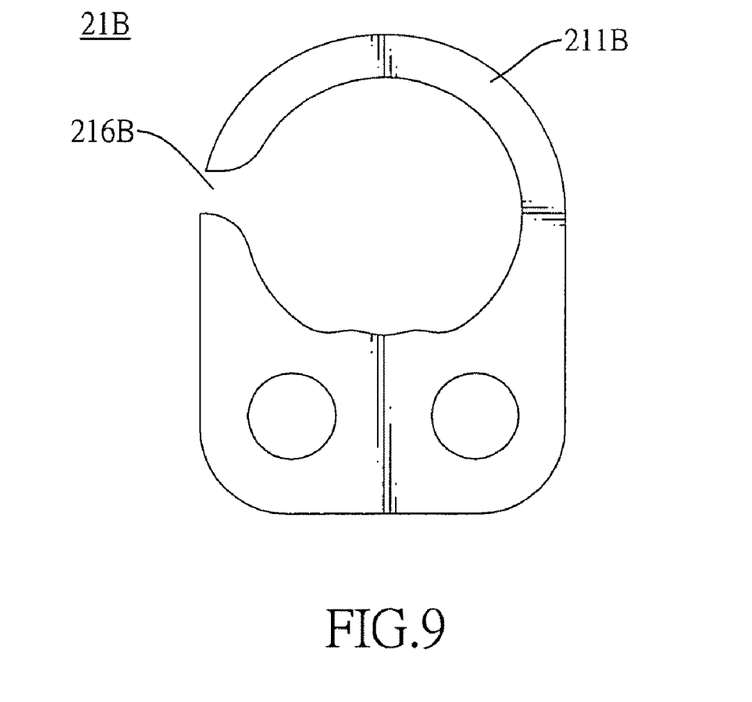
FIG. 9 is a front view of the spacer in FIG. 8.
Figure 10:
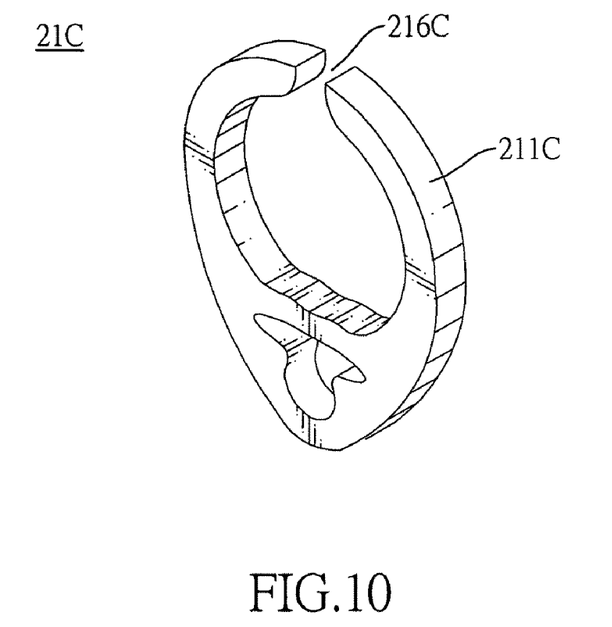
FIG. 10 is a perspective view of a fourth embodiment of a spacer of the hinge in accordance with the present invention.
Figure 11:
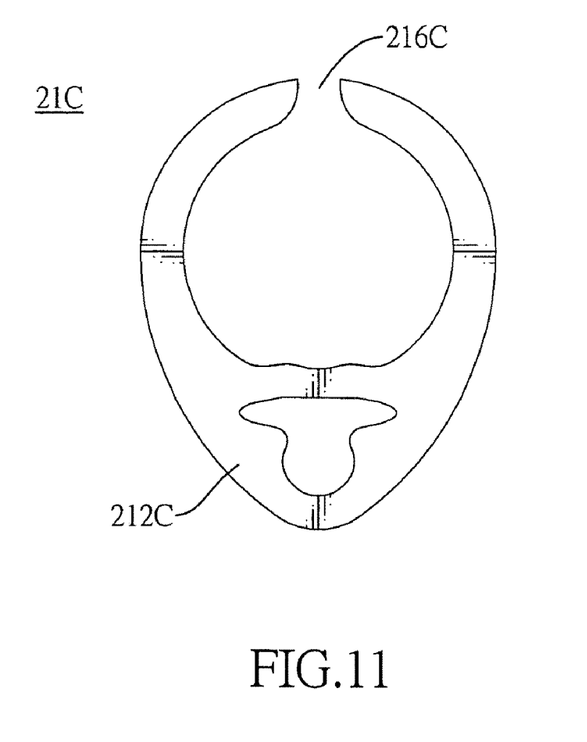
FIG. 11 is a front view of the spacer in FIG. 10.

In a preferred embodiment as shown in FIGS. 8 to 11, each spacer (21B, 21C) has a gap (216B, 216C) formed through a periphery of the ring segment (211B, 211C). The gap (216B, 216C) allows the ring segment (211B, 211C) to expand out. The gap (216C) as shown in FIGS. 10 and 11 may be opposite at 180 degrees to the bearing segment (212C), or the gap (216B) as shown in FIGS. 8 and 9 may be formed through one side of the ring segment (211B) of the spacer (21B).

Figure 12:
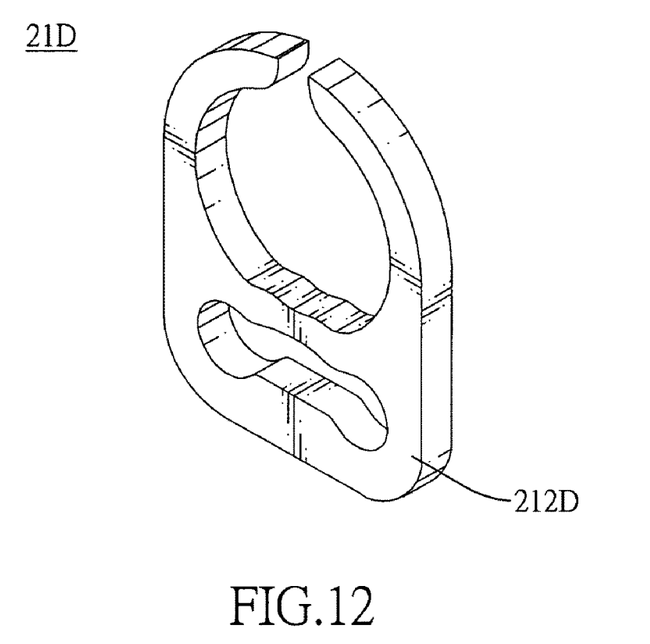
FIG. 12 is a perspective view of a fifth embodiment of a spacer of the hinge in accordance with the present invention.
Figure 13:
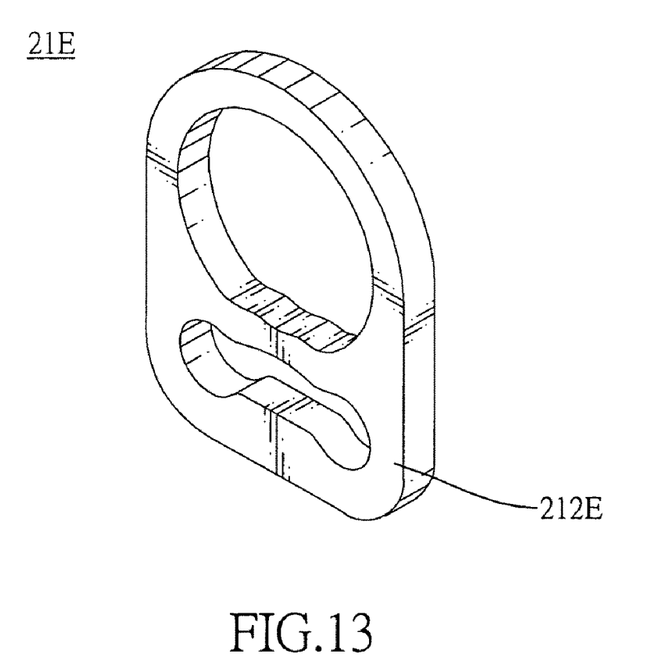
FIG. 13 is a perspective view of a sixth embodiment of a spacer of the hinge in accordance with the present invention.
Figure 14:
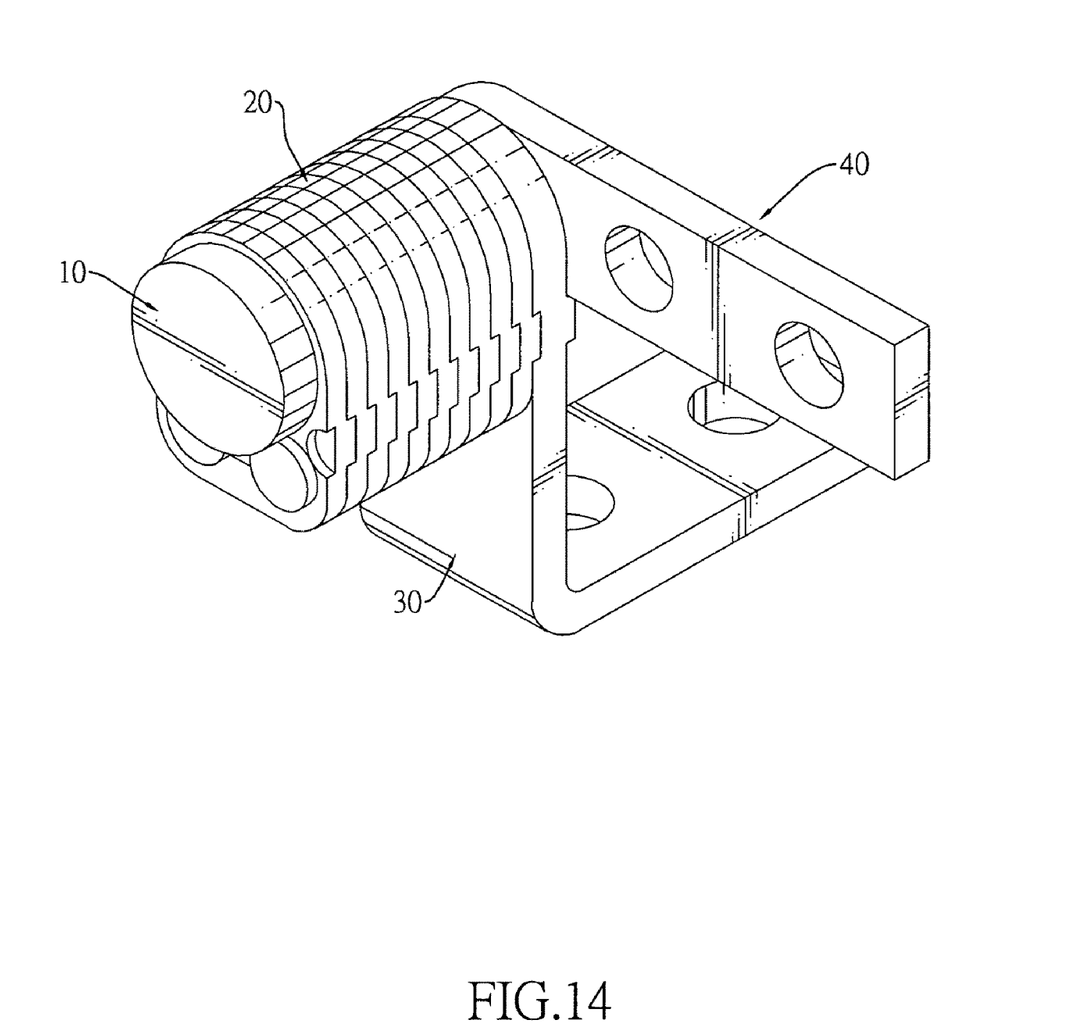
FIG. 14 is a perspective view of a second embodiment of a hinge with multiple spacers in accordance with the present invention.
Figure 15:
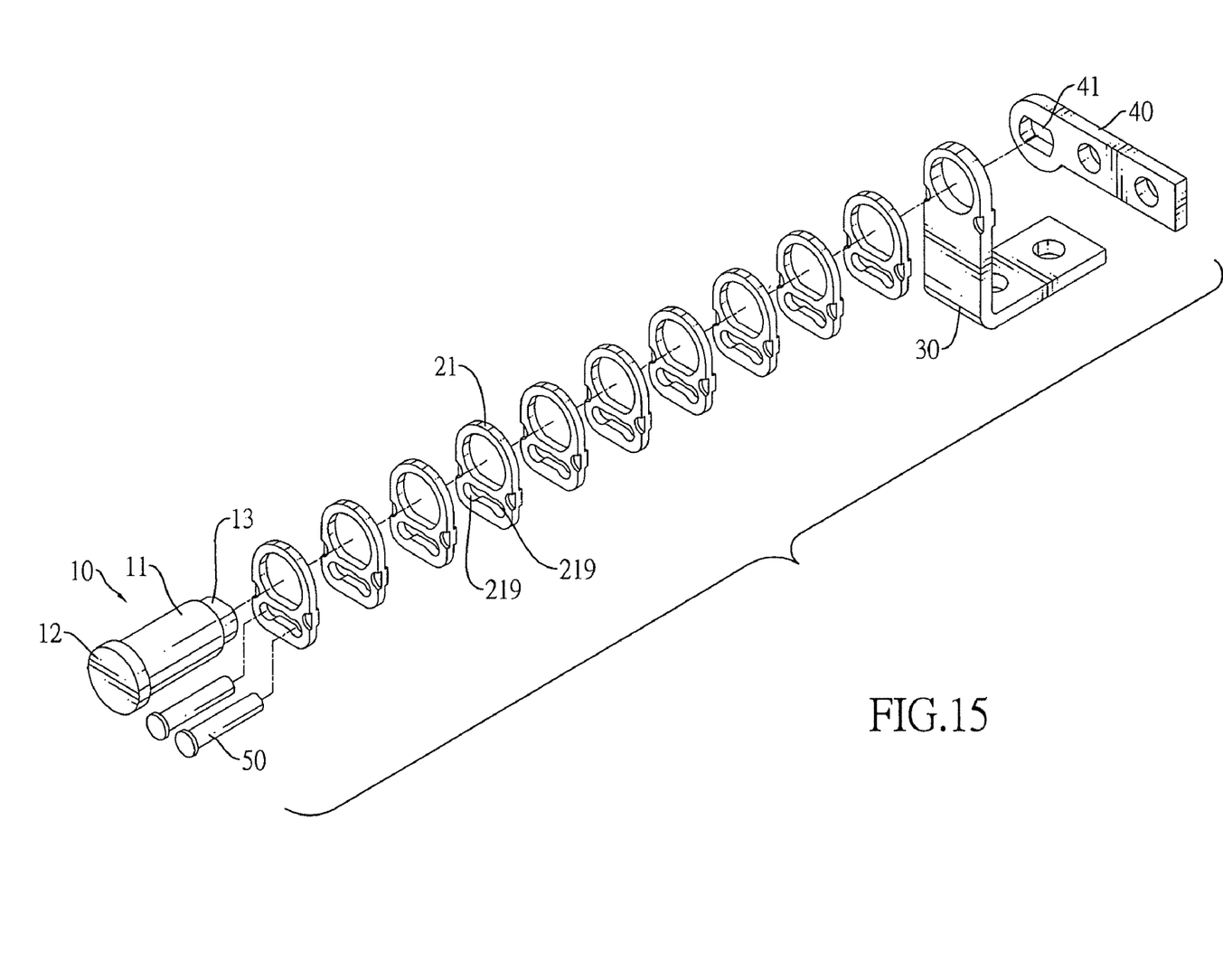
FIG. 15 is an exploded perspective view of the hinge in FIG. 14.

The bearing segment may have different shapes for different needs. In preferred embodiments shown in FIGS. 4, 12 and 13, the bearing segment (212, 212D, 212E) of each spacer (21, 21D, 21E) is rectangular in cross section. In another preferred embodiment as shown in FIGS. 10 and 11, the bearing segment (212C) of each spacer (21C) is an arc.

The spacers are stacked and are attached securely to each other. In preferred embodiment as shown in FIGS. 2 to 4, each spacer (21) has at least one detent (217) formed in one side surface and at least one fastening protrusion (218) formed on the other side surface. The detent (217) corresponds to the fastening protrusion (218). The detent (217) of one spacer (21) engages with the corresponding fastening protrusion (218) of adjacent spacer (21) to stack and attach the spacers (21). In preferred embodiments as shown in FIGS. 3, 4, 14 and 15, the bearing segment (212) of each spacer (21) has at least one fastening hole (219). The fastening hole (219) may or may not communicate with the absorbing space (215). At least one fastener (50) is mounted through the fastening holes (219) of the spacers (21) to attach the spacers (21).

Figure 16:
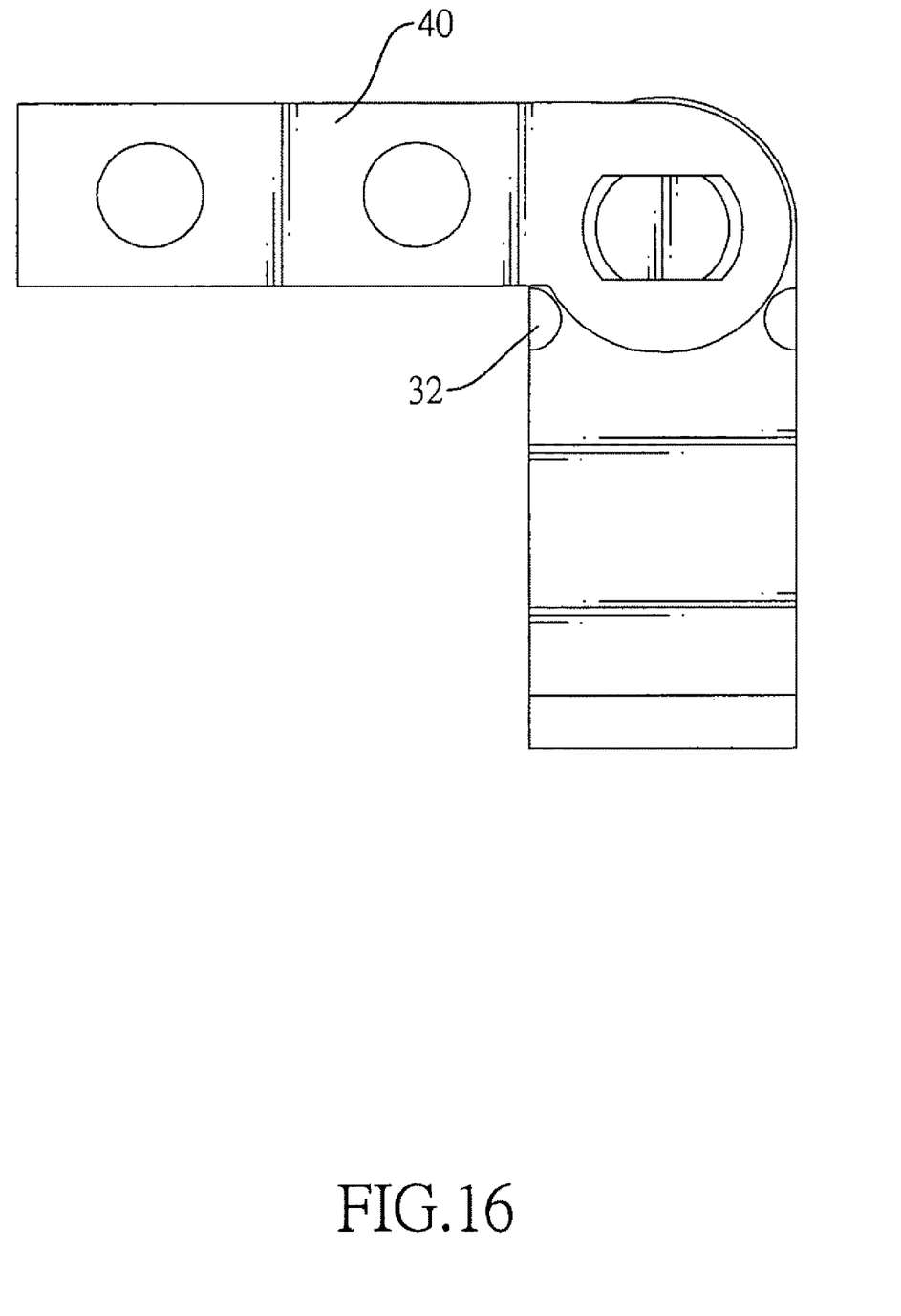
FIG. 16 is a rear view of the hinge in FIG. 14.

The stationary bracket may also have alternative configurations:

In a preferred embodiment as shown in FIGS. 1 and 2, the stationary bracket (30) is L-shaped in cross section and has a stationary wing and a mounting wing. The mounting wing of the stationary bracket (30) is attached to the spacer assembly (20) and has a through hole (301). The pintle (10) is mounted through the spacer assembly (20) and the through hole (301). The mounting wing of the stationary bracket (30) has at least one detent (31) and at least one fastening protrusion (32). The detent (31) or the fastening protrusion (32) engages with the fastening protrusion (218) or the detent (217) of adjacent spacer (21) to hold the spacer assembly (20) with the stationary bracket (30). With further reference to FIG. 16, the fastening protrusion (32) of the stationary bracket (32) selectively abuts against the rotating bracket (40) to limit the rotating angles of the pintle (10) and the rotating bracket (40).

Figure 17:
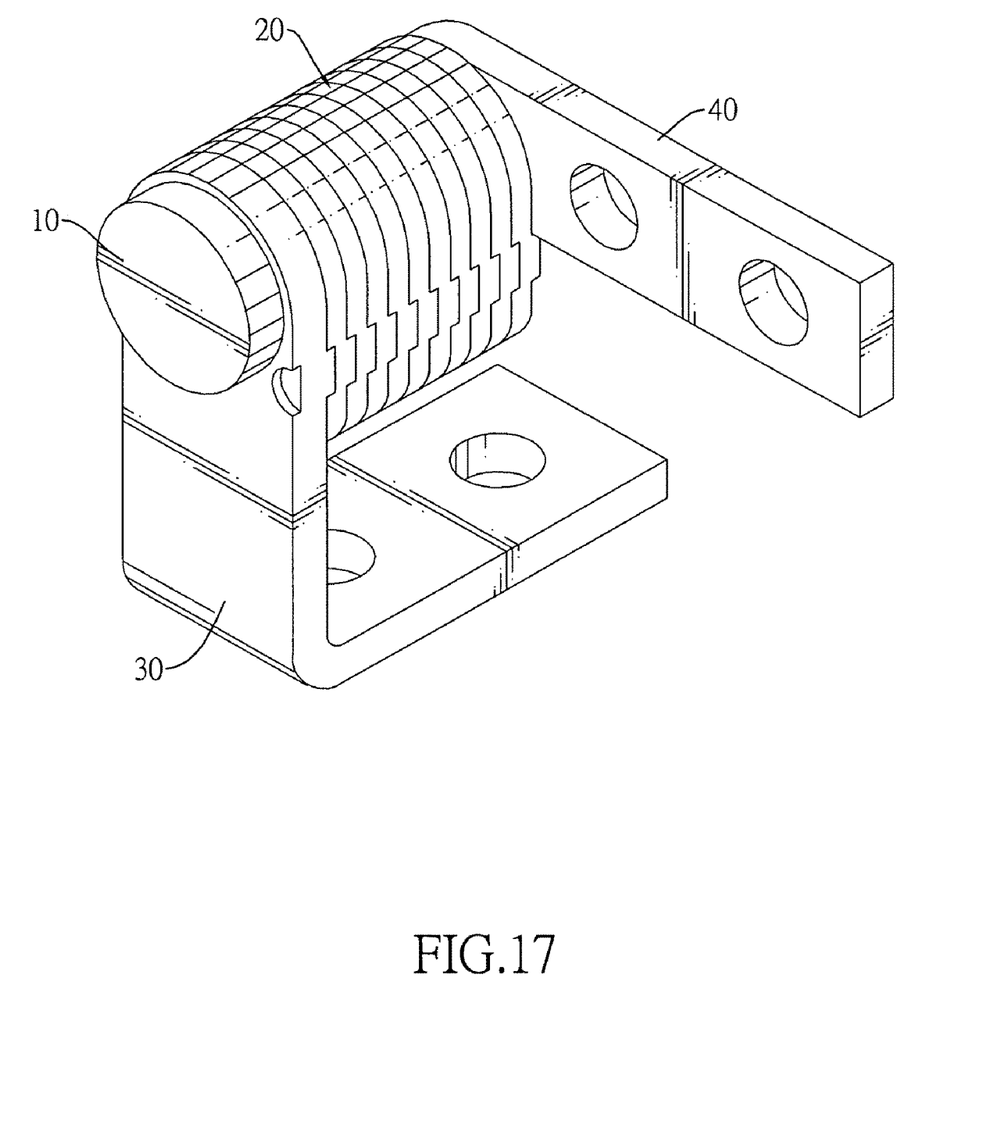
FIG. 17 is a perspective view of a third embodiment of a hinge with multiple spacers in accordance with the present invention.
Figure 18:
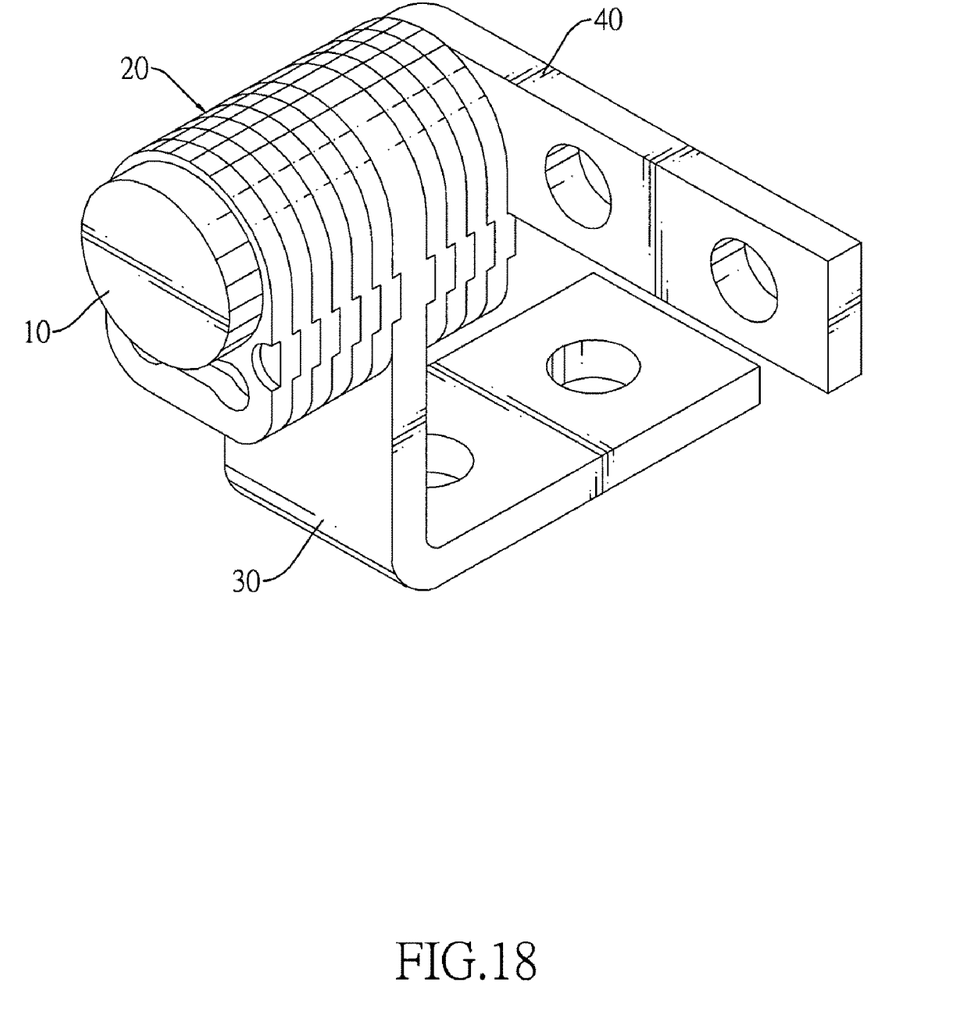
FIG. 18 is a perspective view of a fourth embodiment of a hinge with multiple spacers in accordance with the present invention.

The related position of the stationary bracket (30) and the spacer assembly (20) may be altered. In a preferred embodiment as shown in FIGS. 1 and 2, the spacer assembly (20) is clamped between the stationary bracket (30) and the enlarged head (12) of the pintle (10). In another preferred embodiment as shown in FIG. 17, the stationary bracket (30) is clamped between the spacer assembly (20) and enlarged head (12) of the pintle (10). In another preferred embodiment as shown in FIG. 18, the stationary bracket (30) is mounted in the spacer assembly (20) and is clamped between two adjacent spacers (21).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
   a pintle;
   a spacer assembly mounted rotatably around the pintle and comprising multiple spacers stacked with each other, each spacer having
   a ring segment mounted rotatably around the pintle via a central hole; and
   a bearing segment protruding from an outside wall of the ring segment and having a recess formed in a surface of the bearing segment;
   a stationary bracket mounted rotatably around the pintle and connected securely to the spacer assembly; and
   a rotating bracket mounted securely around the pintle.

2. The hinge as claimed in claim 1, wherein the ring segment of each spacer has a positioning segment formed on an inside wall of the ring segment and abutting against the pintle.

3. The hinge as claimed in claim 1, wherein the ring segment of each spacer has a gap formed through a periphery of the ring segment.

4. The hinge as claimed in claim 3, wherein the gap of each spacer is opposite at 180 degrees to the bearing segment of the spacer.

5. The hinge as claimed in claim 3, wherein the gap of each spacer is formed through one side of the ring segment of the spacer.

6. The hinge as claimed in claim 1, wherein
   each spacer has
   two side surfaces;
   at least one detent formed in one side surface of the spacer;
   at least one fastening protrusion formed on the other side surface of the spacer; and
   each of the at least one detent of each spacer engages with one fastening protrusion of the adjacent spacer.

7. The hinge as claimed in claim 1 further comprising at least one fastener, wherein
   the bearing segment of each spacer has at least one fastening hole formed through the bearing segment; and
   each of the at least one fastener is mounted through the fastening holes of the spacers.

8. The hinge as claimed in claim 1, wherein
   the stationary bracket is L-shaped in cross section and has
   a stationary wing; and
   a mounting wing attached to the spacer assembly and having a through hole; and the pintle is mounted through the spacer assembly and the through hole of the mounting wing.

9. The hinge as claimed in claim 8, wherein
the pintle has
a rod body; and
an enlarged head formed transversely on a distal end of the rod body; and
the spacer assembly is clamped between the stationary bracket and the enlarged head of the pintle.

10. The hinge as claimed in claim 8, wherein
the pintle has
a rod body; and
an enlarged head formed transversely on a distal end of the rod body; and
the stationary bracket is clamped between the spacer assembly and the enlarged head of the pintle.

11. The hinge as claimed in claim 8, wherein
the pintle has
a rod body; and
an enlarged head formed transversely on a distal end of the rod body; and
the stationary bracket is mounted in the spacer assembly and is clamped between two adjacent spacers.

12. A hinge comprising:
a pintle;
a spacer assembly mounted rotatably around the pintle and comprising multiple spacers stacked with each other, each spacer having
a ring segment mounted rotatably around the pintle via a central hole; and
a bearing segment protruding from an outside wall of the ring segment and having an elongated hole formed through the bearing segment;
a stationary bracket mounted rotatably around the pintle and connected securely to the spacer assembly; and
a rotating bracket mounted securely around the pintle.

13. The hinge as claimed in claim 12, wherein the ring segment of each spacer has a positioning segment formed on an inside wall of the ring segment and abutting against the pintle.

14. The hinge as claimed in claim 12, wherein the ring segment of each spacer has a gap formed through a periphery of the ring segment.

15. The hinge as claimed in claim 12, wherein
each spacer has
two side surfaces;
at least one detent formed in one side surface of the spacer; and
at least one fastening protrusion formed on the other side surface of the spacer; and
each of the at least one detent of each spacer engages with one fastening protrusion of the adjacent spacer.

16. The hinge as claimed in claim 12, wherein
the stationary bracket is L-shaped in cross section and has
a stationary wing; and
a mounting wing attached to the spacer assembly and having a through hole; and
the pintle is mounted through the spacer assembly and the through hole of the mounting wing.

17. The hinge as claimed in claim 16, wherein
the pintle has
a rod body; and
an enlarged head formed transversely on a distal end of the rod body; and
the spacer assembly is clamped between the stationary bracket and the enlarged head of the pintle.

* * * * *